US 6,819,342 B2
(12) United States Patent
Kitagawa et al.

(10) Patent No.: US 6,819,342 B2
(45) Date of Patent: *Nov. 16, 2004

(54) GRAPHIC DATA PROCESSING APPARATUS USING DISPLAYED GRAPHICS FOR APPLICATION PROGRAM SELECTION

(75) Inventors: Keiji Kitagawa, Raionzugaden Yurigaoka 415, 3-6-1 Takaishi, Asou-ku, Kawasaki-shi, Kanagawa-ken (JP); Ikuo Tani, Ibaraki (JP)

(73) Assignees: Keiji Kitagawa, Kawasaki (JP); Design Automation Inc., Nagaokakyo (JP); Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 902 days.

This patent is subject to a terminal disclaimer.

(21) Appl. No.: 09/407,069

(22) Filed: Sep. 28, 1999

(65) Prior Publication Data

US 2002/0054147 A1 May 9, 2002

Related U.S. Application Data

(63) Continuation of application No. 08/858,809, filed on May 19, 1997, which is a continuation of application No. 08/576,375, filed on Dec. 21, 1995, now Pat. No. 5,651,120, which is a division of application No. 08/283,894, filed on Aug. 3, 1994, now Pat. No. 5,502,800, which is a division of application No. 07/654,182, filed on Feb. 13, 1991, now Pat. No. 5,337,402, which is a continuation-in-part of application No. 07/443,832, filed on Dec. 1, 1989, now abandoned, which is a continuation of application No. 07/060,910, filed on Jun. 12, 1987, now abandoned.

(30) Foreign Application Priority Data

Jun. 12, 1986 (JP) .......................................... 61-137727

(51) Int. Cl.⁷ ................................................. G09G 5/00
(52) U.S. Cl. ...................... 345/808; 345/817; 345/809; 345/964; 345/975
(58) Field of Search ................................. 345/808, 809, 345/819, 964, 975

(56) References Cited

U.S. PATENT DOCUMENTS 4,586,035 A    4/1986   Baker et al. ................ 340/712

(List continued on next page.)

FOREIGN PATENT DOCUMENTS

| JP | 59-197930 | 11/1984 |
| JP | 60-107179 | 6/1985 |
| JP | 60-204077 | 10/1985 |
| JP | 60-207968 | 10/1985 |
| JP | 59-210486 | 5/1988 |

OTHER PUBLICATIONS

James F. Fuller, "Using AutoCAD: Release 10 with 3–D", 3rd Edition, 1989, Chapter 6, pp. 14–23 through 14–27.
M. Jackson, "Software Requirements & Specifications", Addison–Wesley, (1995), pp 158–163.

(List continued on next page.)

Primary Examiner—Ba Huynh
(74) Attorney, Agent, or Firm—Foley & Lardner

(57) ABSTRACT

A graphic data processing apparatus comprising a CPU coupled to an entry device, storage storing graphic data and a plurality of programs and a display, and adapted such that a command mode for drawing a desired graphic form is selected by designating the corresponding desired graphic form in the already displayed graphic forms and a program for drawing the graphic form is automatically selected.

15 Claims, 16 Drawing Sheets

U.S. PATENT DOCUMENTS

| | | | | |
|---|---|---|---|---|
| 4,686,522 A | * | 8/1987 | Hernandez et al. | 345/160 |
| 4,698,625 A | | 10/1987 | McCaskill et al. | 345/157 |
| 4,725,829 A | | 2/1988 | Murphy | 345/145 |
| 4,747,074 A | * | 5/1988 | Yoshida | 345/522 |
| 4,812,996 A | | 3/1989 | Stubbs | 364/487 |
| 4,815,029 A | * | 3/1989 | Barker et al. | 707/516 |
| 4,868,766 A | | 9/1989 | Oosterholt | 364/522 |
| 4,931,783 A | | 6/1990 | Atkinson | 340/710 |
| 4,984,180 A | | 1/1991 | Wada et al. | 364/518 |
| 5,123,087 A | * | 6/1992 | Newell et al. | 345/348 |
| 5,235,679 A | | 8/1993 | Yoshizawa et al. | 345/336 |
| 5,299,307 A | | 3/1994 | Young | 395/161 |
| 5,337,402 A | | 8/1994 | Kitagawa et al. | 395/133 |
| 5,347,628 A | | 9/1994 | Brewer et al. | 395/159 |
| 5,408,601 A | | 4/1995 | Nakamura et al. | 395/155 |
| 5,504,499 A | * | 4/1996 | Horie et al. | 345/150 |
| 5,610,824 A | * | 3/1997 | Vinson et al. | 364/474.24 |

\* cited by examiner

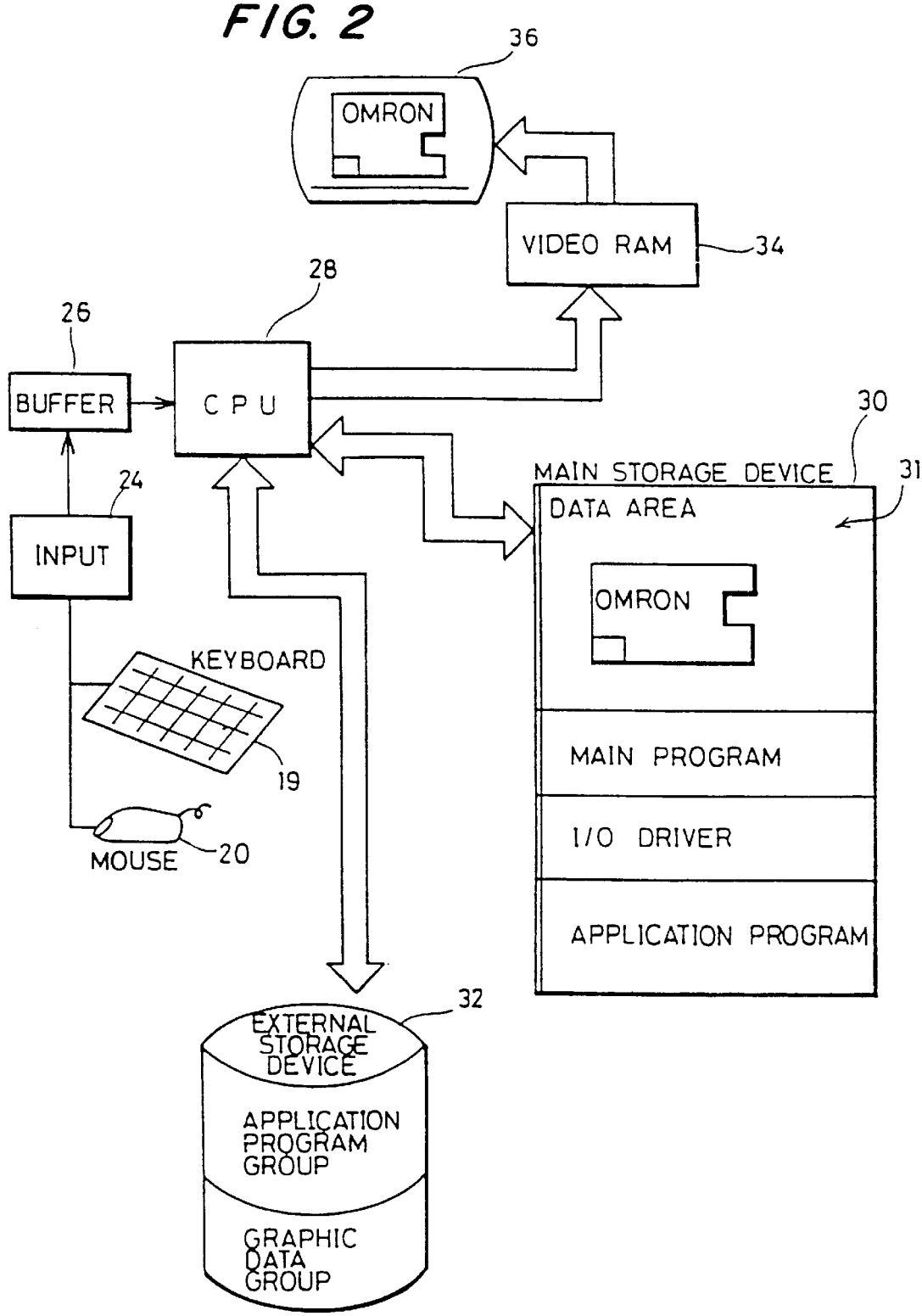

FIG. 3

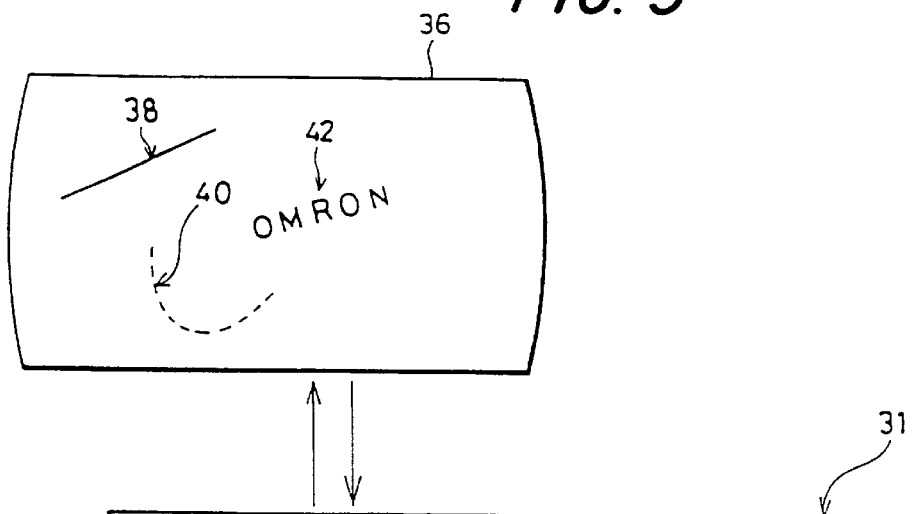

| STRAIGHT LINE | START POINT COORDINATES: x1 y1 | END POINT COORDINATES: x2 y2 |
| | LINE: SOLID LINE | THICKNESS OF LINE: 0.6mm |
| | COLOR: BLUE | |
| CIRCULAR ARC | CENTER COORDINATES: x3 y3 | RADIUS: r1 |
| | ANGLE AT START POINT: θ1 | ANGLE AT END POINT: θ2 |
| | LINE: BROKEN LINE | THICKNESS OF LINE: 0.4mm |
| | COLOR: GREEN | |
| CHARACTERS | START POINT COORDINATES: x4 y4 | HEIGHT: h |
| | WIDTH: W | SPACE BETWEEN CHARACTERS: 1/2 |
| | ANGLE OF INCLINATION: θ3 | KIND OF CHARACTERS: ALPHABETICAL LETTERS |
| | CONTENT: OMRON | COLOR: WHITE |
| | | |

| |
|---|
| CLASSIFICATION CODE |
| SUB CODE |
| LAYER NO. |
| COLOR CODE |
| LINE TYPE CODE |
| LINE END CODE |
| OBJECT COMMAND CODE |
| OTHER ATTRIBUTE INFORMATION |
| P 1 |
| P 2 |
| P 3 |
| P 4 |
| P 5 |

| | STRAIGHT LINE | DOT | CIRCLE | CIRCULAR ARC | CHARACTERS |
|---|---|---|---|---|---|
| P 1 | X1 | X | X | X | X |
| P 2 | Y1 | Y | Y | Y | Y |
| P 3 | X2 | — | R | R | $\theta$ |
| P 4 | Y2 | — | — | $\theta_1$ | h d |
| P 5 | — | — | — | $\theta_2$ | n i |

GRAPHIC DATA PROCESSING APPARATUS USING DISPLAYED GRAPHICS FOR APPLICATION PROGRAM SELECTION

This application is a continuation, application Ser. No. 08/858,809, filed May 19, 1997 Pub. No. 50720054145, which is in turn a continuation of application Ser. No. 08/576,375, filed Dec. 21, 1995, now Pat. No. 5,651,120, which is in turn a divisional of application Ser. No. 08/283,894, filed Aug. 3, 1994, now Pat. No. 5,502,800; which is a divisional of application Ser. No. 07/654,182, filed Feb. 13, 1991, now Pat. No. 5,337,402; which is a continuation-in-part of Ser. No. 07/443,832, filed Dec. 1, 1989, now abandoned; which is a continuation of Ser. No. 07/060,910, filed Jun. 12 1987 now abandoned.

BACKGROUND OF THE INVENTION

1. Field of the Invention

The present invention relates to an improvement of a graphic data processing apparatus using a computer generally called a CAD (Computer Aided Design) system or a CAD/CAM (Computer Aided Design/Computer Aided Manufacturing) system.

2. Description of the Prior Art

FIG. 1 is an illustration showing an example of a display screen of a conventional CAD/CAM system. Referring to FIG. 1, operation for displaying graphic data such as a graphic form, characters or symbols on the display screen by using the conventional CAD/CAM system will be described.

A menu area 12 is provided for example in a lower portion of the display screen 10. Ten commands at maximum for example can be displayed at a time in the menu area 12. A user selects a desired command, if any, out of the commands displayed in the menu area 12. If there is not any desired command among the displayed commands, the user advances the display in the menu area 12 to search for a desired command in a manner of turning over display pages whereby the desired command is selected.

More specifically stated, in order to draw a circle for example, operation is to be performed in the following manner. First of all, the following commands are displayed in the menu are 12:

"① layer, ② change of frames, ③ setting of a reference, ④ cancellation of the reference, ⑤ zoom, ⑥ drawing, ⑦ next item, ⑧ menu"

The user designates the command "⑥ drawing" by using a pointing device such as a mouse, a light pen or a cursor. Then, the following commands appear in the menu area:

"① line segment, ② continuous line, ③ auxiliary line, ④ circle, ⑤ cross, ⑥ arc, ⑦ sector, ⑧ spline, ⑨ next item, ⑩ rise"

appear in the menu area 12. Thus, if the command "④ circle" is designated by the pointing device, a command mode for drawing a circle is set, whereby a program for drawing a circle is read out.

If the user wants to draw "characters", he designates the command "⑨ next item" appearing in the menu area 12 and changes display pages repeatedly until a desired command, namely, a command "characters" appears.

After having set the desired command mode, for example, the command "circle", the user designates, by using the pointing device, a place where a circle is to be drawn on a graphic display area 14 of the display screen 10. In the case of drawing a "circle", the user designates for example a center point (center coordinates) and a radius by using the pointing device. As a result, the circle is drawn. Attributes of the circle thus drawn, namely, data as to whether the circle is represented by a solid line, a dotted line or a chained line, and data as to the color of the line, the thickness of the line etc. are displayed in an attribute display area 16. It is also possible to change attributes of the thus drawn circle.

The number of commands for data processing increases, as performance of a CAD/CAM system becomes high. Accordingly, in the case of command display using the menu area 12 where only about less than ten commands can be displayed at a time, tens of pages for display of commands are required. As a result, it takes much time and labor to search for a desired command.

If the user knows which page contains which commands, the commands can be searched relatively smoothly. However, in order to do so, the user needs to have much skill in use of the apparatus.

On the other hand, there is a system for inputting commands from a tablet 18 (as shown in FIG. 1) instead of the menu area 12. However, in this system for inputting commands by the tablet 18, it is not easy to search for a desired command out of all of the commands displayed on the tablet 18, for example, more than 100 commands, which involves disadvantages that much time is required for selection of desired commands.

In addition, in either system using the menu 12 or the tablet 18, a content of each command is often expressed by an extremely short abbreviation. For example, a command indicating "draw a straight line" is expressed as "LN" and a command indicating "draw a circle" is expressed as "CR". Therefore, if such a command display method using abbreviations is adopted, training for having knowledge of contents of the commands is also required.

SUMMARY OF THE INVENTION

The present invention has been accomplished to solve the above described problems involved in a conventional apparatus.

Therefore, it is an object of the present invention to provide a graphic data processing apparatus and method which allow easy, quick and exact designation of commands at the time of selecting commands to display a graphic form, characters, symbols, or the like on a display screen.

It is another object of the present invention to provide a graphic data processing apparatus which can be easily operated.

In a graphic data processing apparatus of the present invention, an arbitrary displayed portion out of already displayed graphic data such as a graphic form, characters or symbols is designated by display designating means and the data concerning the designated displayed portion is detected by storage means so that an application program is selected based on the detected content.

When a desired portion of the already displayed graphic form, characters or symbols is designated, a command for displaying the designated graphic form or the like is selected so that an application program corresponding thereto is read out. Consequently, it is not needed to select a desired command out of a large number of commands, and thus selection of commands can be effected rapidly and correctly by using the already displayed graphic form or the like.

According to another aspect of the present invention, it is possible to select a drawing application program for drawing a basic display element constituting a graphic form by designating a part of the graphic form and it is also possible to select a drawing application program for drawing the graphic form per se, that is, a composite display element. When a program for drawing a basic display element is selected, the same graphic form as the basic display element can be drawn on a display. When a program for drawing a composite display element is selected, the same graphic form as the composite display element can be drawn on the display.

According to a further aspect of the invention, a plurality of drawing application programs related with display elements constituting a graphic form are displayed in a menu form by designation of a part of the graphic form. By selection of a menu, it is possible to draw a desired graphic form using one drawing application program.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic block diagram showing a construction of a graphic data processing apparatus in accordance with a first embodiment of the present invention.

FIG. 3 is an illustration showing a relation between displayed contents and data stored in a data base of the above mentioned embodiment of the present invention.

DESCRIPTION OF THE PREFERRED EMBODIMENTS

Figure 1:
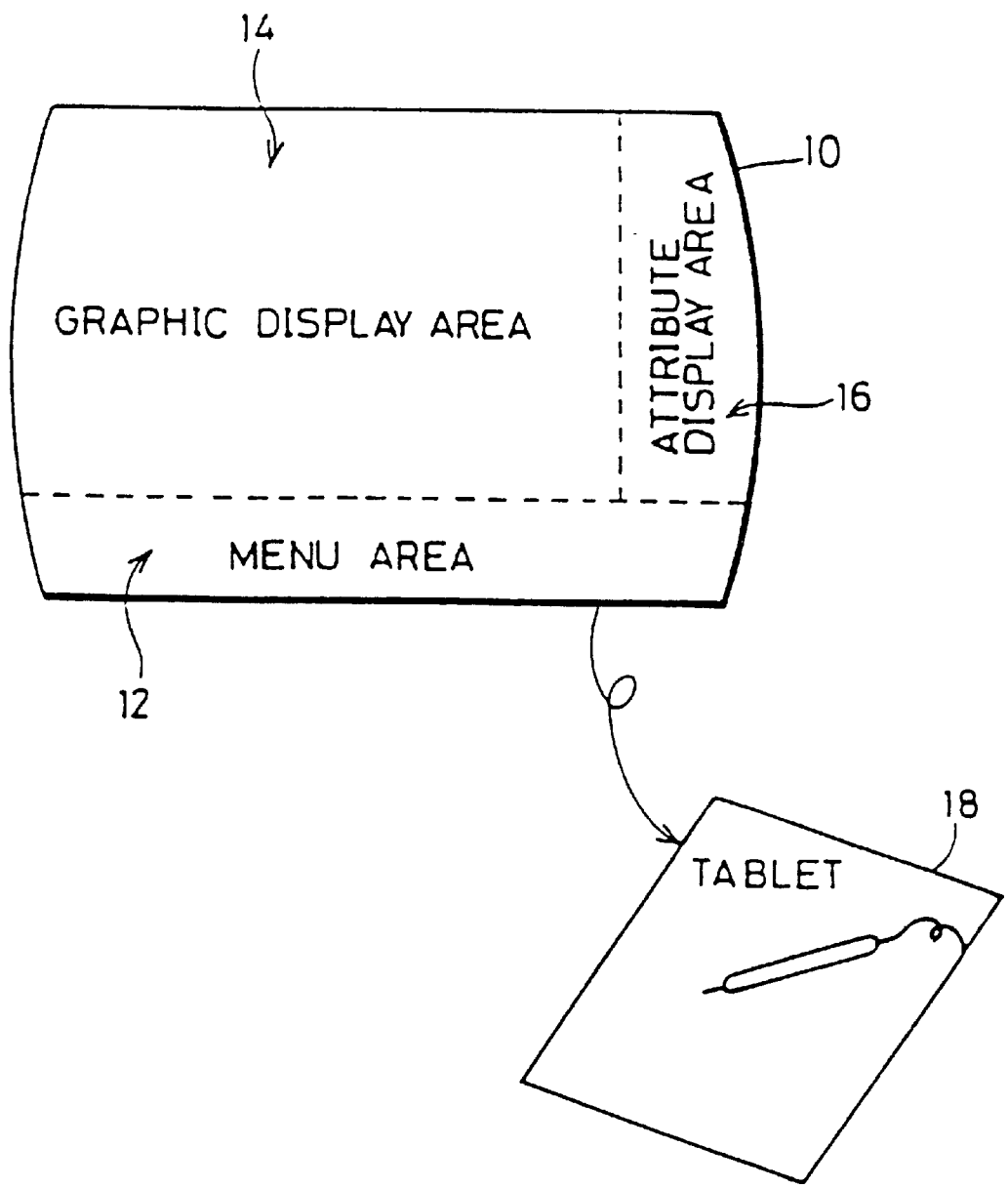
FIG. 1 is an illustration showing contents displayed in a conventional CAD/CAM system.

Referring to the drawings, an embodiment of the present invention will be described in detail in the following.

First Embodiment

FIG. 2 is a schematic block diagram showing a total construction of this embodiment. Signals inputted from a keyboard 19 and a mouse 20 as pointing device are supplied to a CPU 28 from an input circuit 24 through a buffer circuit 26. The CPU 28 is a control center of the apparatus of this embodiment and it is responsive to the input signals supplied thereto and performs operation for processing of data based on a main program stored in a main storage device 30. More specifically, the CPU 28 receives a command selection signal inputted from the keyboard 19 and the mouse 20, the CPU 28 reads out a program corresponding to the specified command among an application program group stored in an external storage device 32 (for example, a floppy disk, a solid-state memory device such as a ROM, a cassette tape etc.) and stores the program in a specified area in the main storage device 30. When a signal for specifying a display area is supplied from the keyboard 19 or the mouse 20, the CPU 28 performs processing of data based on the stored application program and supplies data to a video RAM 34. The data supplied to the video RAM 34 is displayed on a display 36. The display data processed by the CPU 28 is stored in a data area 31 of the main storage device 30.

FIG. 3 is an illustration showing a relation between graphic forms and characters displayed on the screen of the display 36 and contents stored in the data area 31 of the main storage device 30. Referring to FIG. 3, let us assume a case in which a solid straight line 38 and a circular arc 40 in dotted line and characters "OMRON" 42 are displayed on the display 36 as shown. In this case, data on the straight line 38, data on the circular arc 40 and data on the characters 42 are stored in the data area 31. More specifically, the data on the straight line 38 such as:

"start point coordinates: $x_1$, $y_1$, end point coordinates: $x_2$, $Y_2$, line: solid line, thickness of line: 0.6 mm, color: blue", the data on the circular arc 40 such as:

"center coordinates: $x_3$, $y_3$, radius: $r_1$, angle at start point: $\theta_1$, angle at end point: $\theta_2$, line: broken line, thickness of line: 0.4 mm, color: green", and the data on the characters 42 such as:

"start point coordinates: $x_4$, $y_4$, height: h, width: w, space between characters: ½, angle of inclination: $\theta_3$, kind of characters: alphabetical letters, content: OMRON, color: white"

are stored in the data area 31.

Figure 4:
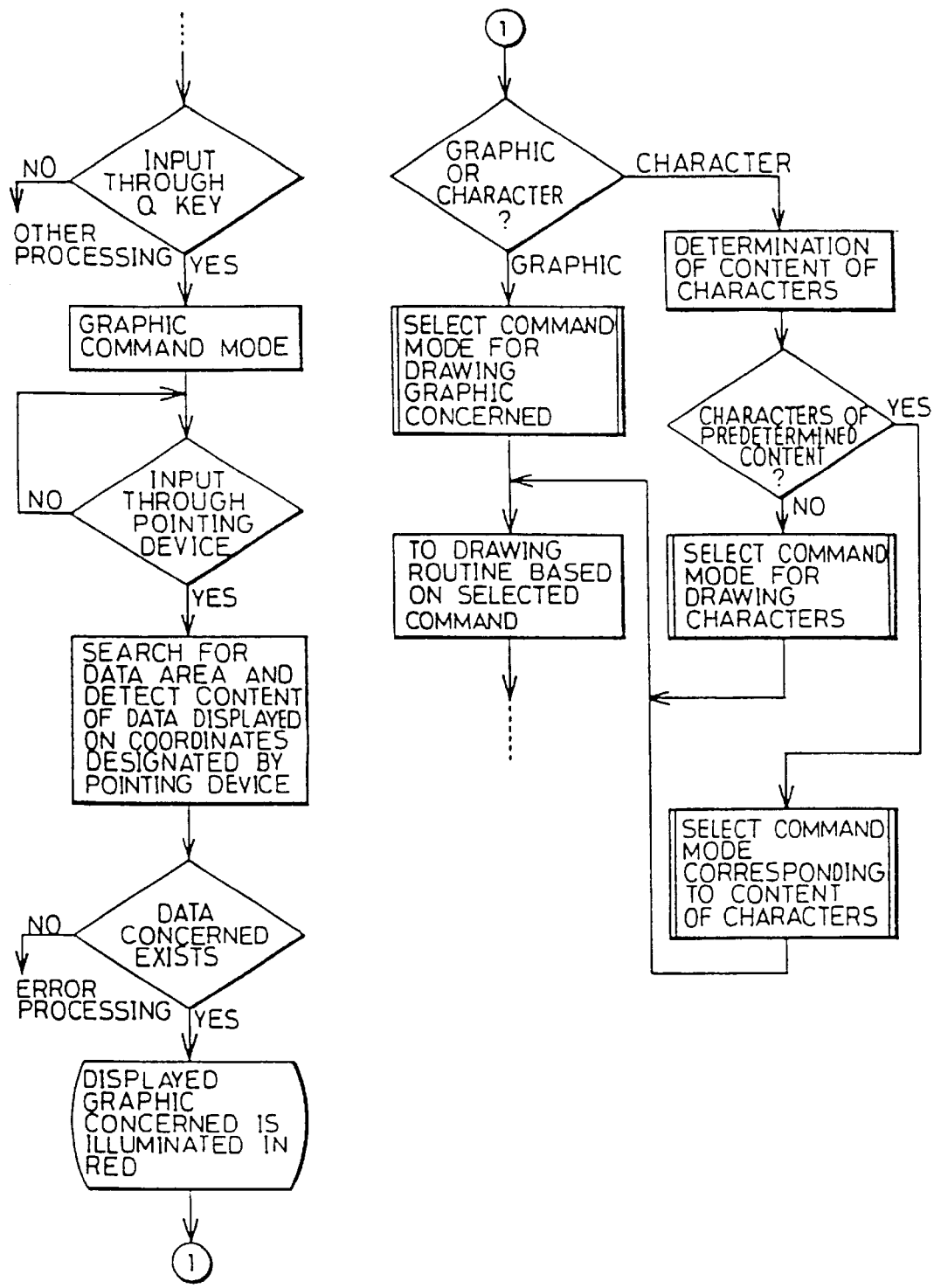
FIG. 4 is a flow chart showing processing operation of the above mentioned embodiment of the present invention.

FIG. 4 is a flow chart showing operation for executing command selection processing by utilizing already displayed graphic forms and the like (referred to hereinafter as "graphic-command" processing) in the graphic data processing apparatus of the embodiment of the present invention. Referring to the flow in FIG. 4, and if necessary, to FIGS. 2 and 3, the graphic command changing operation will be described.

When the user presses a specified key, for example, a Q key in the keyboard 19 and the CPU 28 detects the input through the Q key, a graphic command mode is set in the apparatus.

In the graphic command mode, the CPU 28 waits for input of a signal from the mouse 20. The user designates, by using the mouse 20, a graphic form of the same type as that of a graphic form to be represented next, out of the already displayed graphic forms and the like on the display 36. For example, referring to FIG. 3, if the graphic form to be represented next is a circular arc, the user designates an arbitrary portion of the circular arc 40 by using the mouse 20.

Responsive to the designation input from the mouse 20, the CPU 28 searches the data area 31, thereby to detect the display data including the point (coordinates) designated by the mouse 20. Data on the circular arc in the data area 31 shown in FIG. 3 has display data (center coordinates: $x_3$, $y_3$, radius: $r_1$, angle at start point $\theta_1$, and angle at end point $\theta_2$) corresponding to a line (a locus) passing through coordinates designated by the mouse 20. Accordingly, in this case, the data on the circular arc 40 is detected from the data area 31.

If the data concerned is not stored in the data area 31, this means that a point which is not concerned with any forms or the like is designated by the mouse 20 and accordingly error processing is performed.

If display data including the point designated by the mouse 20 is detected, the CPU 28 illuminates the designated graphic form, the circular arc 40 in this case, in a particular color, for example red so that the user can observe that the data of the circular arc 40 is detected.

Then, the CPU 28 determines whether the detected data is graphic data or character data. Since the data detected in this case is graphic data on the circular arc 40, the CPU 28 reads out the application program for drawing the circular arc from the application program group in the external storage device 32 and stores it in a specified area in the main storage device 30 so that a command mode for drawing the desired graphic form, namely, the circular arc is set.

Thus, the apparatus is ready for drawing the circular arc.

If characters are designated by the mouse 20, for example, if the characters "OMRON" 42 in FIG. 2 are designated, the CPU 28 identifies the content of the characters and determines whether the content of the characters corresponds to a predetermined meaning of characters. The predetermined meaning of character is for example "CIRCLE", "LINE", "MOVE" or the like. If the designated characters have the predetermined meaning, a program indicated by the meaning, for example, a program for drawing a line, or a program for moving a displayed content can be selected. If the designated characters do not have the predetermined meaning, the CPU 28 sets a mode for drawing characters.

Referring to FIG. 3, a command mode may be changed according to the types of data such as "straight line", "circular arc" or "characters" to select an application program corresponding to the type of data. Attributes data such as the type of a line or color may be changed to those of the designated data. In addition, specified attributes data may remain the same as the attribute data before the change of the command mode.

Although in this embodiment, the application programs for the selected commands are stored in the external storage device 32, they may be stored in the main storage device 30 if the main storage device has a large memory capacity.

Further, if no graphic form or the like is displayed on the display 36, for example, before the start of operation of the apparatus, processing in a graphic command mode, that is, designating a command by using already displayed graphic form and the like cannot be performed. However, in that case, if a menu for drawing graphic data to be utilized frequently, such as a straight line, a circle or an alphabetical letter is displayed in advance in a corner or other places of the display 36, processing in the graphic command mode can be performed using the displayed menu.

As described above, if a desired graphic data is chosen from the already displayed graphic data, the apparatus changes the command mode to automatically select a program for drawing the graphic form or the like of the type of the chosen data.

Thus, the present invention makes it possible to provide a graphic data processing apparatus easy to handle, which is capable of designating commands rapidly and correctly, since a command mode for drawing a desired graphic form is selected by designating the corresponding desired graphic form in the already displayed graphic forms and the like and a program for drawing the graphic form is automatically selected.

Second Embodiment

Figure 5:
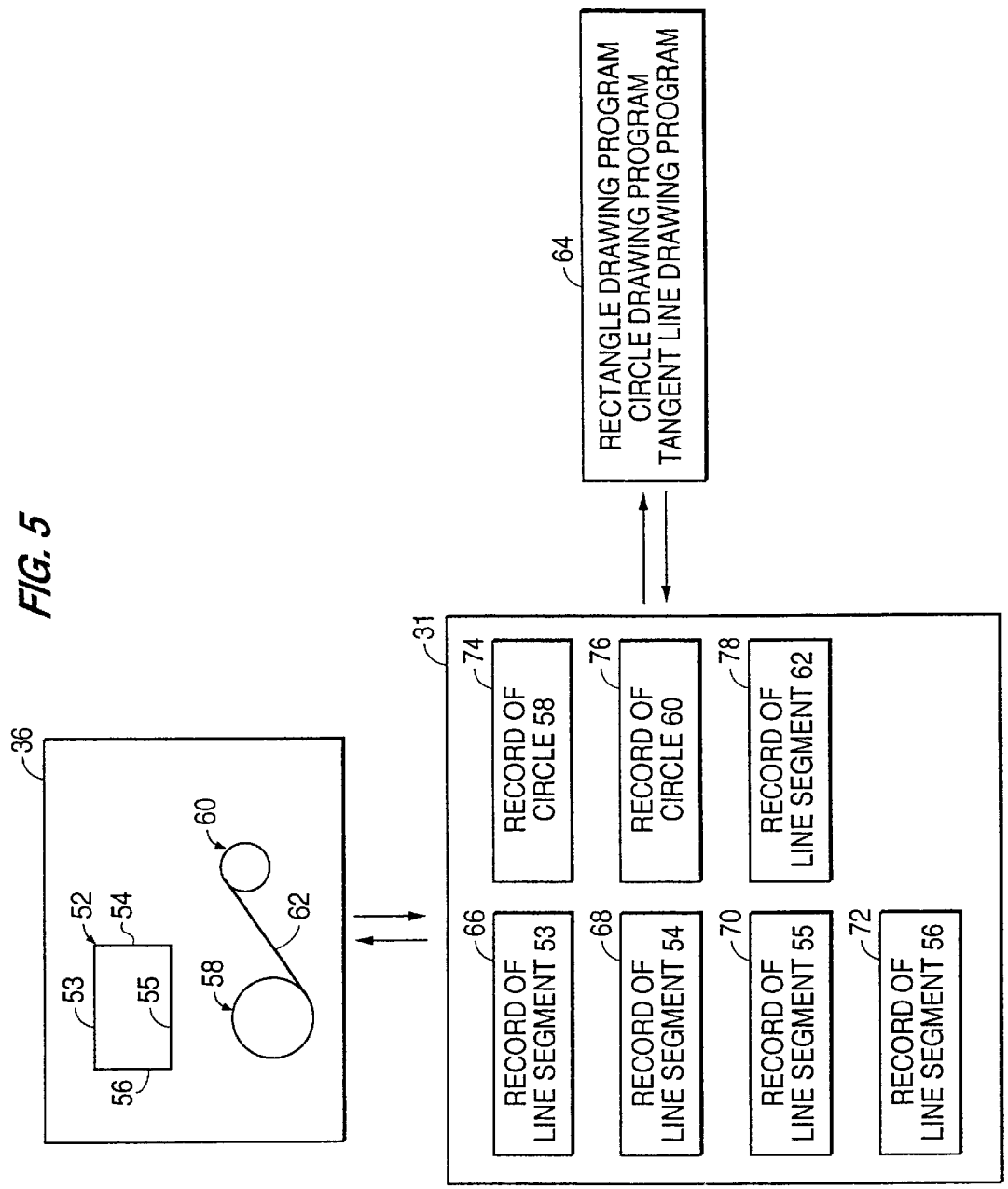
FIG. 5 is a diagram for explaining relations among contents of display, data stored in data base, and an application program used for displaying a graphic form according to a second embodiment of the present invention.

FIG. 5 shows relations among contents of display, data stored in data base, and application programs used for displaying graphic forms according to the second embodiment. Referring to FIG. 5, a rectangle 52, two circles 58 and 60, and a tangent line 62 between with those circles are drawn on a display 36. The rectangle 52 consists of four line segments 53, 54, 55 and 56. A record 66 of the line segment 53, a record 68 of the line segment 54, a record 70 of the line segment 55, a record 72 of the line segment 56, a record 74 of the circle 58, a record 76 of the circle 60, and a record 78 of the line segment 62 are stored in a data base 31. Object command codes representing the rectangle are stored in the records 66, 68, 70 and 72 as will be described afterwards with reference to FIG. 6. Object command codes representing the circles are stored in the records 74 and 76. An object command code representing the tangent line is stored in the record 78. A rectangle drawing program, a circle drawing program and a tangent line drawing program corresponding to the above mentioned object command codes are stored in an application program storing area 64 of a main storage device 30. A common format of each of the above-mentioned records 66, 68, 70, 72, 74, 76 and 78 is shown in FIG. 6.

Figures 6, 7:
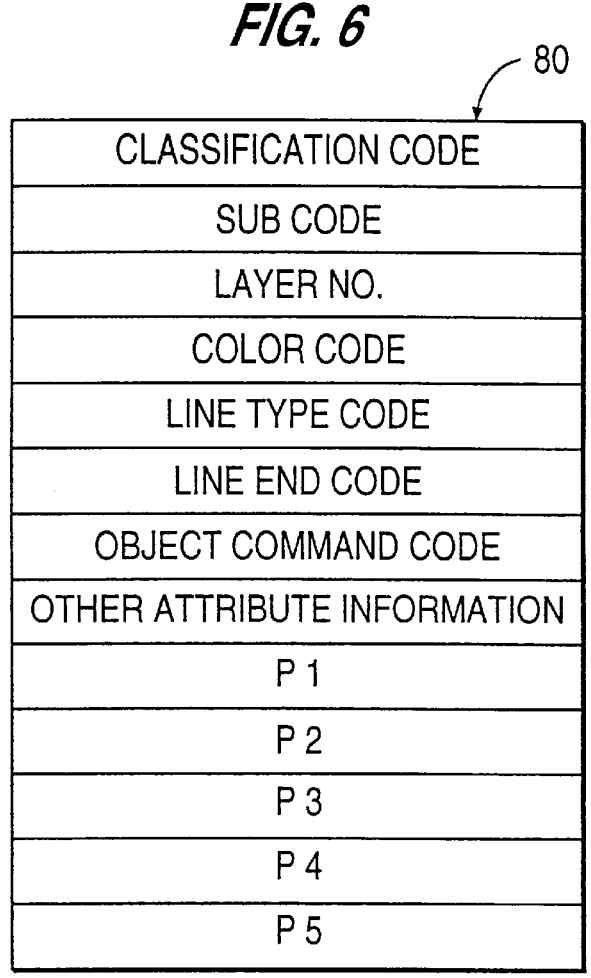
FIG. 6 is a diagram showing a formation of the data base shown in FIG. 5.
FIG. 7 is a diagram for explaining stored contents in the graphic information areas shown in FIG. 6.

Referring to FIG. 6, a data record 80 stored in the data base 31 includes a classification code, a sub code, layer No., a color code, a line type code, a line end code, object command code as mentioned above, other attribute information and graphic form information of P1 to P5. The data record 80 corresponds to a basic element. In this embodiment, straight lines, dots, circles, circular arcs and characters are provided as basic elements. The classification codes "1", "2", "3", "4" and "5" indicate that the basic elements concerned are a straight line, a dot, a circle, a circular arc and characters, respectively.

According to this embodiment, it is possible to draw a basic element using a classification code as will be described afterwards. The content displayed on the display 36 may be in a multi-layer structure, and for example a graphic form may be displayed in the first layer and a size of the graphic form may be displayed in the second layer. The layer Nos. represent the numbers of such display layers. The color codes represent colors of the above-mentioned basic elements, and the line type code indicates which of the solid line, dotted line, chain line etc. is to be used to draw the basic element concerned. The line end code indicates whether an arrow, a dot or the like is given at an end of a line. The abject command code is a code for accessing a program for drawing a composite element corresponding to the basic element of the record concerned. For example if the composite element is a rectangle, the basic element of the composite element is a line segment. Consequently, the object command code corresponding to the rectangle is stored in the record of the line segments constituting the rectangle. Similarly, an object command code corresponding to a tangent line is stored in the record of the line segment constituting the tangent line. An object command code corresponding to a circle is stored in the record of the circle.

Referring next to FIG. 7, the graphic information P1 to P5 shown in FIG. 6 will be described. If the classification code is a code representing a straight line, X coordinate: X1, Y coordinate: Y1 of the start point of the line segment are stored in the areas P1 and P2 of the record 80, respectively, and X coordinate: X2 and Y coordinate: Y2 of the end point of the line segment are stored in the areas P3 and P4, respectively. If the classification code is a code representing a dot, X coordinate and Y coordinate of that dot are stored in the areas P1 and P2, respectively. If the classification code is a code representing a circle, X coordinate and Y coordinate of the center of the circle are stored in the areas P1, P2, respectively, and the radius: R of the circle is stored in the area P3. If the classification code is a code representing a circular arc, X coordinate and Y coordinate of the center of the circular arc are stored in the areas P1 and P2, respectively, and the radius: R of the circular arc is stored in the area P3. The start angle: $\theta_1$ is stored in the area P4 and the end angle: $\theta_2$ is stored in the area P5. If the classification code is a code representing characters, X coordinate and Y coordinate of the center of the first character of the arrangement of the drawn characters are stored in the areas P1 and P2, respectively; the angle: $\theta$ formed by the arrangement of characters with respect to the X axis is stored in the area P3; the size: h of each character and the spacing: d of the respective characters are stored in the area P4; and the number of characters: n and the character code: i are stored in the area P5.

Figure 8:
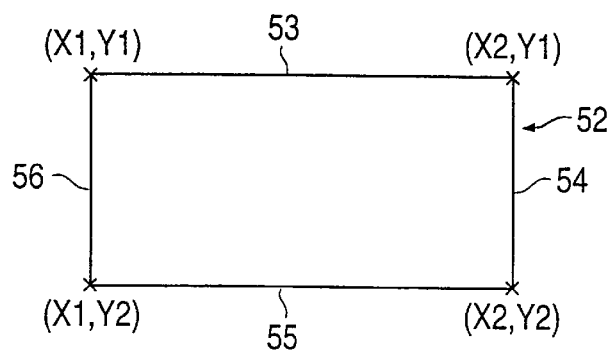
FIGS. 8 and 9 are diagrams for explaining contents of display and data of data base according to the second embodiment of the invention.
Figure 9:
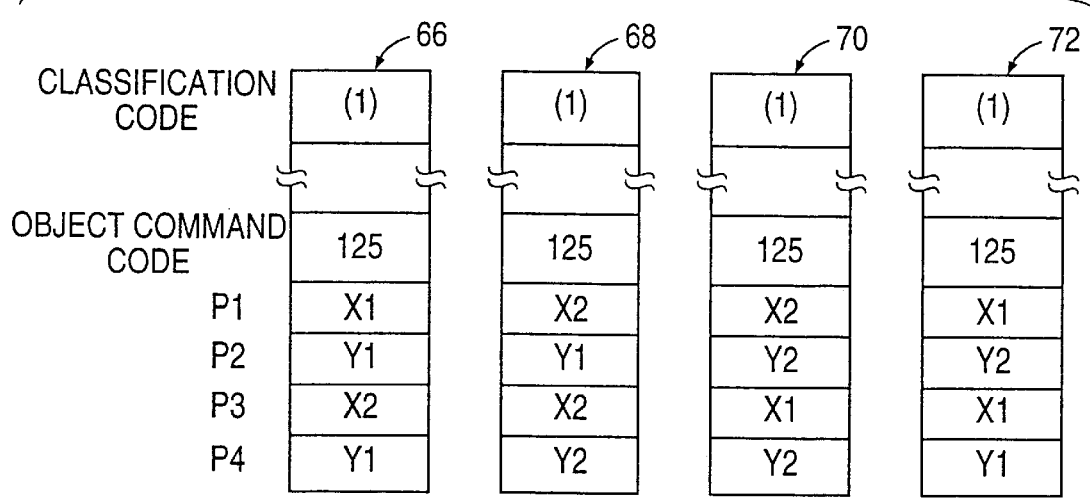

If the rectangle 52 shown in FIG. 5 is positioned as shown in FIG. 8, four records 66, 68, 70 and 72 corresponding to four line segments of the rectangle 52 exist in the data base as shown in FIG. 9. In those records, the classification codes (1) represent straight lines and the object command codes "125" represent the rectangle. The coordinates of both ends of each line segment are stored in the areas P1, P2, P3 and P4 of each record.

Figure 10:
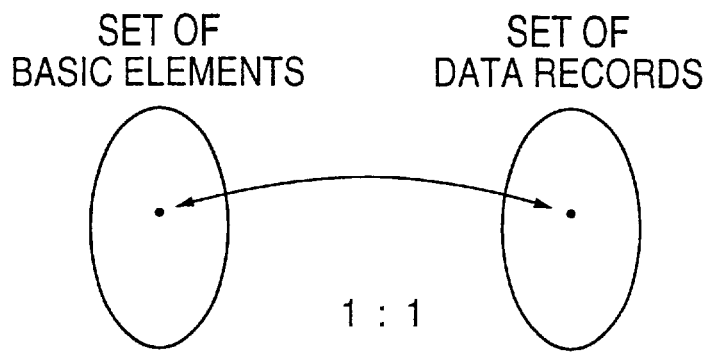
FIG. 10 is an illustration showing a relation between a set of basic elements and a set of data records according to the second embodiment of the invention.
Figure 11:
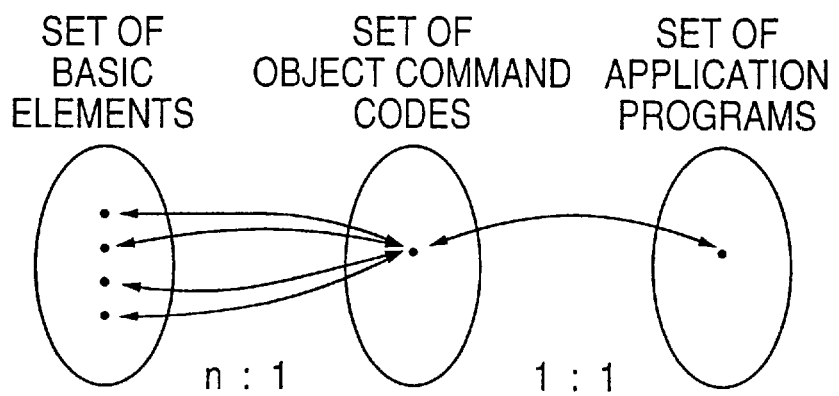
FIG. 11 is an illustration showing relations among a set of basic elements, a set of object command codes, and a set of application programs according to the second embodiment of the invention.

FIG. 10 shows a relation between the set of the basic elements identified by the classification codes and the set of the data records in the data base, and FIG. 11 shows relations among the set of basic elements, the set of object commands, and the set of application commands. Referring to FIG. 10, it is understood that one of the records of the data base corresponds to one of the basic elements constituting a composite element such as a graphic form represented on the display 36. For example, the record 66 shown in FIG. 9 corresponds only to the line segment 53 shown in FIG. 8. Referring to FIG. 11, it is understood that a plurality of basic elements correspond to one object command code. For example, the object command code "125" corresponding to the rectangle corresponds to the line segments 53, 54, 55 and 56. In addition, it is understood that one object command code corresponds to one application program for drawing a composite element. For example, the object command code "125" corresponding to the rectangle corresponds to a rectangle drawing program. In short, it is understood that the set of basic elements and the set of data records have a 1:1 correspondence, while the set of basic elements and the set of application programs do not have a 1:1 correspondence but an n:1 correspondence.

Figure 12:
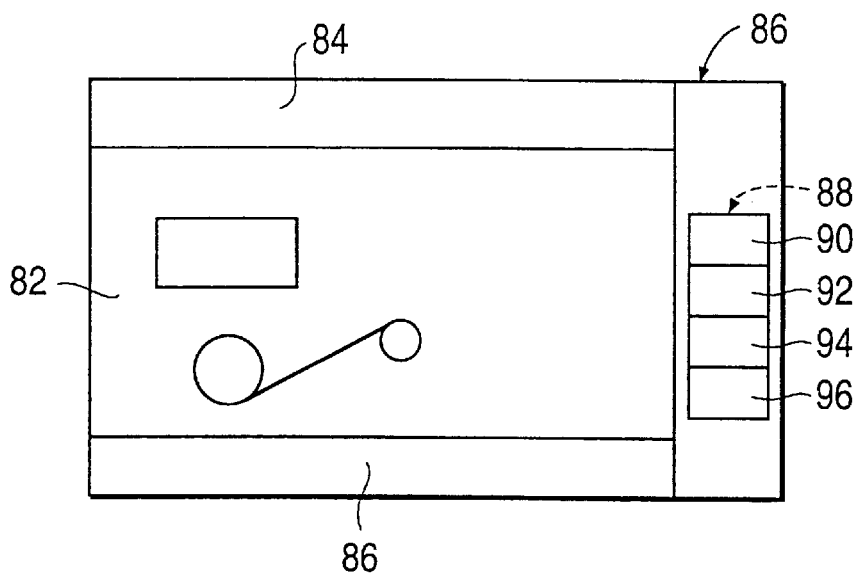
FIG. 12 is an illustration for explaining display according to the second embodiment of the invention.

FIG. 12 is a diagram showing a manner of display on the display 36 according to the second embodiment of the invention. Referring to FIG. 12, the display 36 has an area 82 for drawing a graphic form, a menu area 84 for selecting a drawing program or a drawing command for drawing the graphic form, an area 86 for displaying a message showing the operator how an input device should be operated, and an attribute information area 88 displaying attribute information set currently in the main program. The attribute information area 88 includes an area 90 for displaying a layer No., an area 92 displaying a color code by a numeral or a color, an area 94 displaying a line type code, and an area 96 displaying a line end code. Any area of the attribute information area 88 is designated by means of a mouse 20 and the button of the mouse 20 is depressed, whereby the attribute of the area is updated. For example, let us assume that the area 92 of the color code now represents blue. In this case, when the color code area 92 is designated by means of the mouse 20 and the button of the mouse is depressed, the color code area 92 changes to the next color code, red for example. Thus, desired attribute information can be set in the main program. The attribute information in the main program is supplied to the drawing program used for the drawing and the graphic form is drawn by using the attribute information. The commands displayed in the menu area 84 include a line segment, a straight line, a contact line, a tangent line between circles, hatching lines, a rectangle, a circle, a circular arc, a contact circle, a horizontal dimension, a vertical dimension, a dimension of a diameter, characters, etc.

Figure 13:
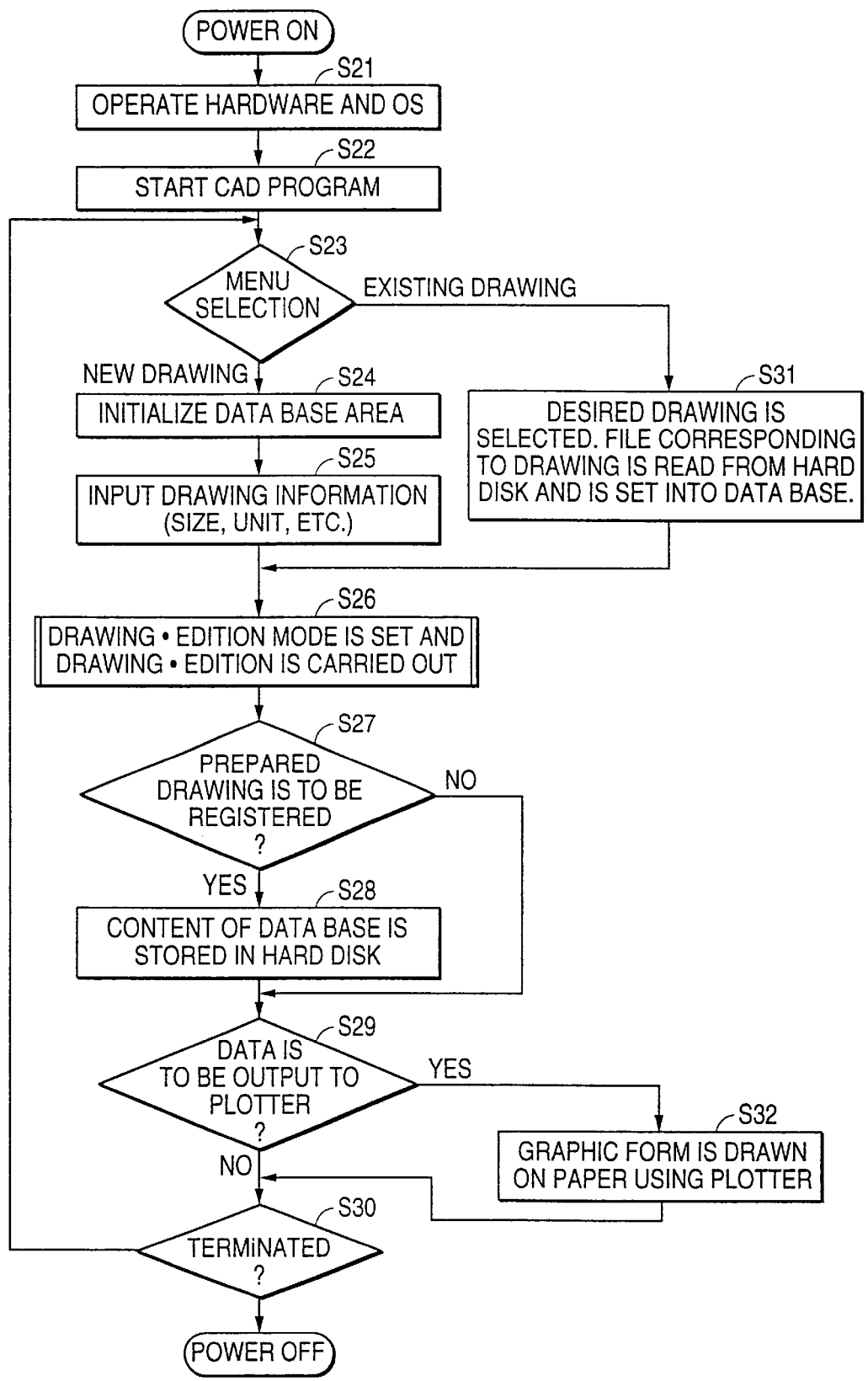
FIG. 13 is a flow chart for explaining operation of the second embodiment of the invention.

FIG. 13 is a flow chart for explaining operation of the second embodiment of the invention. Referring now to FIG. 13, operation for drawing a graphic form in the second embodiment will be described.

When the power supply is turned on, the hardware and operating system of the graphic processing apparatus operate in step S21 and, in step S22, a CAD (Computer Aided Design) program starts to be executed. In step S23, the first menu is shown on the display 36. The operator selects drawing of a new graphic form or drawing of a graphic form using a registered drawing data, by means of the mouse 20 for example. If the drawing of a new graphic form is selected, a data base area 31 is initialized in step S24 and a size and a measurement unit (mm) or the like of the drawing are input in stem S25. If the drawing of a graphic form using a registered drawing data is selected, a desired drawing number is input using a keyboard 19 or the mouse 20 in step S31. Then, based on the drawing number, a file corresponding to the drawing is read from the hard disk ant the file is set in the data base area 31.

In either of the above-mentioned two cases, i.e., the case of drawing the new graphic form and the case of drawing the graphic form using the registered drawing data, a drawing•edition mode is set in step S26, and drawing and edition are carried out in that mode. Specific operation of drawing•edition will be described afterwards. Next, in step S27, it is indicated whether the drawn graphic form is to be registered or not. When the graphic form is drawn, display data corresponding to the prepared drawing is stored in data base. If the registration is instructed, the content stored in the data base is stored in the hart disk in step S28. In step S29, an instruction is issued to the plotter to output data or not. If the output of data to the plotter is instructed, the graphic form is drawn on paper by suing the plotter in step S32. Next, in step S30, it is determined whether the processing is to be terminated or not. If the processing is not to be terminated, the program proceeds to step S23.

Figure 14:
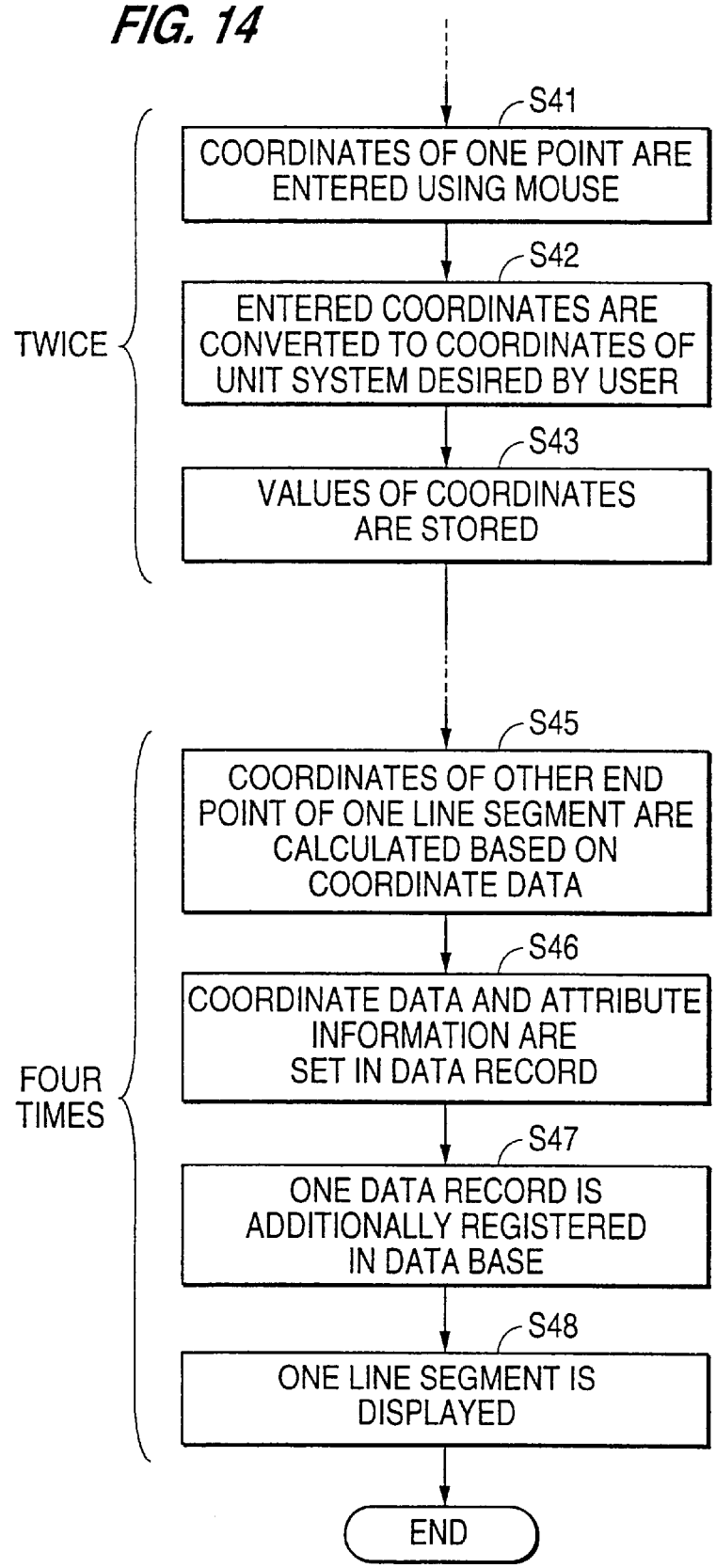
FIG. 14 is a flow chart for explaining a specific example of operation in step S26 shown in FIG. 13.

Next, the operation of step S26 in FIG. 13 will be described taking a rectangle and a tangent line between circles as examples. Referring first to FIG. 14, operation for drawing a rectangle will be described. A rectangle drawing routine is started by selection of a menu shown in the area 84 of the display 36 or input of a specific command from the keyboard 19. When the rectangle drawing routine is started, a message "designate two points constituting a diagonal of the rectangle" is shown in the area 86 of the display 36. In step S41, coordinates of one point are entered using the mouse 20 for example. Alternatively, coordinate data may be entered from the keyboard 19. In step S42, to coordinates in a dot unit on the display 36 are converted to coordinates represented in a unit system used by the user, e.g., mm, inches or the like. Next, in step S43, values of the coordinates thus converted are stored in the memory. Steps S41, S42 and S43 are executed twice and, as a result, the coordinate data of the two points constituting the diagonal of the rectangle are obtained. Then, in step S45, coordinates of the other end point of the line segment are calculated based on the coordinate data. In step S46, the calculated coordinate data and the same attribute information as the attribute information shown in the area 88 of the display 36 are set in the data record, whereby the data record shown in FIG. 6 is formed. In step S47, the data record thus formed is additionally registered in the data base. In step S48, one line segment corresponding to the data record is displayed in the area 82 of the display 36. The above-mentioned steps S45, S46, S47 and S48 are executed four times. As a result, the data records corresponding to the four line segments of the rectangle are registered in the data base and the rectangle is drawn on the display 36.

Figure 15:
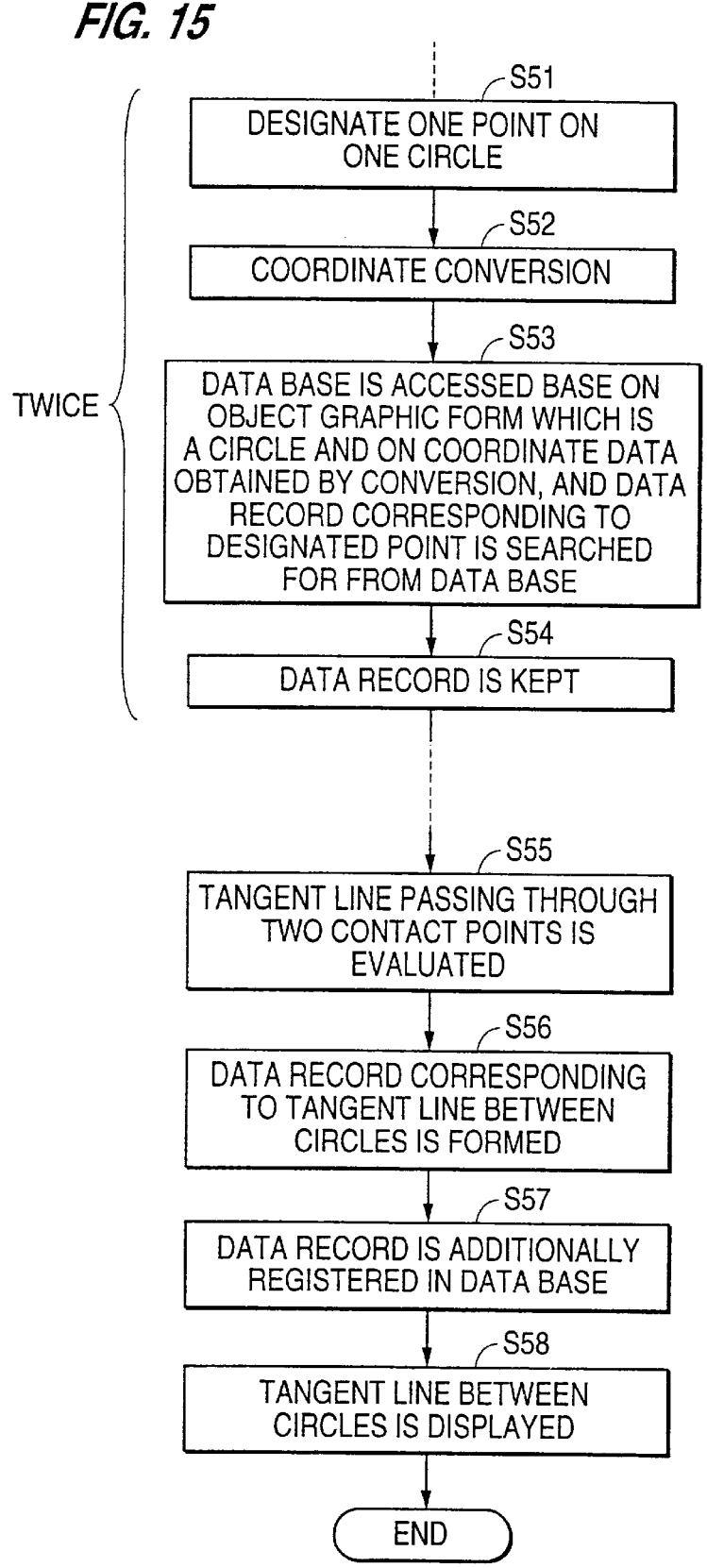
FIG. 15 is a flow chart for explaining another specific example of operation in step S26 shown in FIG. 13.

Referring next to FIG. 15, operation for drawing a tangent line in contact with two circles will be described. A tangent line drawing routine is started by selection of a menu displayed in the area 84 of the display 36 or by input of a specific command from the keyboard 19. Now, let us assume that two circles are drawn on the display 36 before a tangent line drawing command is issued. When the tangent line drawing routine is started, a message "designate contact points" is displayed in the area 86 of the display 36. In step S51, a point on a circle is designated by using the mouse 20 for example, whereby dot coordinates of the designated point are entered. In step S52, the entered dot coordinates are converted to coordinates of a unit system used by the user, e.g., in mm in the same manner as in the case of step S42 in FIG. 14. Next, in step S53, the data base is accessed based on the circle as the object graphic form and the coordinate data thus obtained, whereby the data record of the circle corresponding to the designated point is searched for from the data base. It is to be noted that the circle as the object graphic form has been already determined by the selection of the tangent line drawing routine. In step S54, the data record searched for is kept. The above-mentioned steps S51, S52, S53 and S54 are executed twice, and, as a result, data records of the two circles are kept.

Next, in step S55, an equation of a tangent line in strict contact with the two circles is obtained based on the coordinates of the designated two contact points and the equations of the two circles. Consequently, even if precise positions of the contact points are not designated in step S51, it is possible to obtain the tangent line in contact with the two circles. Briefly stated, the operator is able to draw the tangent line only by designating positions near the contact points of the tangent line to be drawn. In step S56, a data record corresponding to the tangent line is formed. Specifically, the data record corresponding to the line segment connecting the two contact points of the tangent line is formed. Next, in step S57, the formed data record is additionally registered in the data base. In step S58, the tangent line is shown on the display 36.

Figure 16:
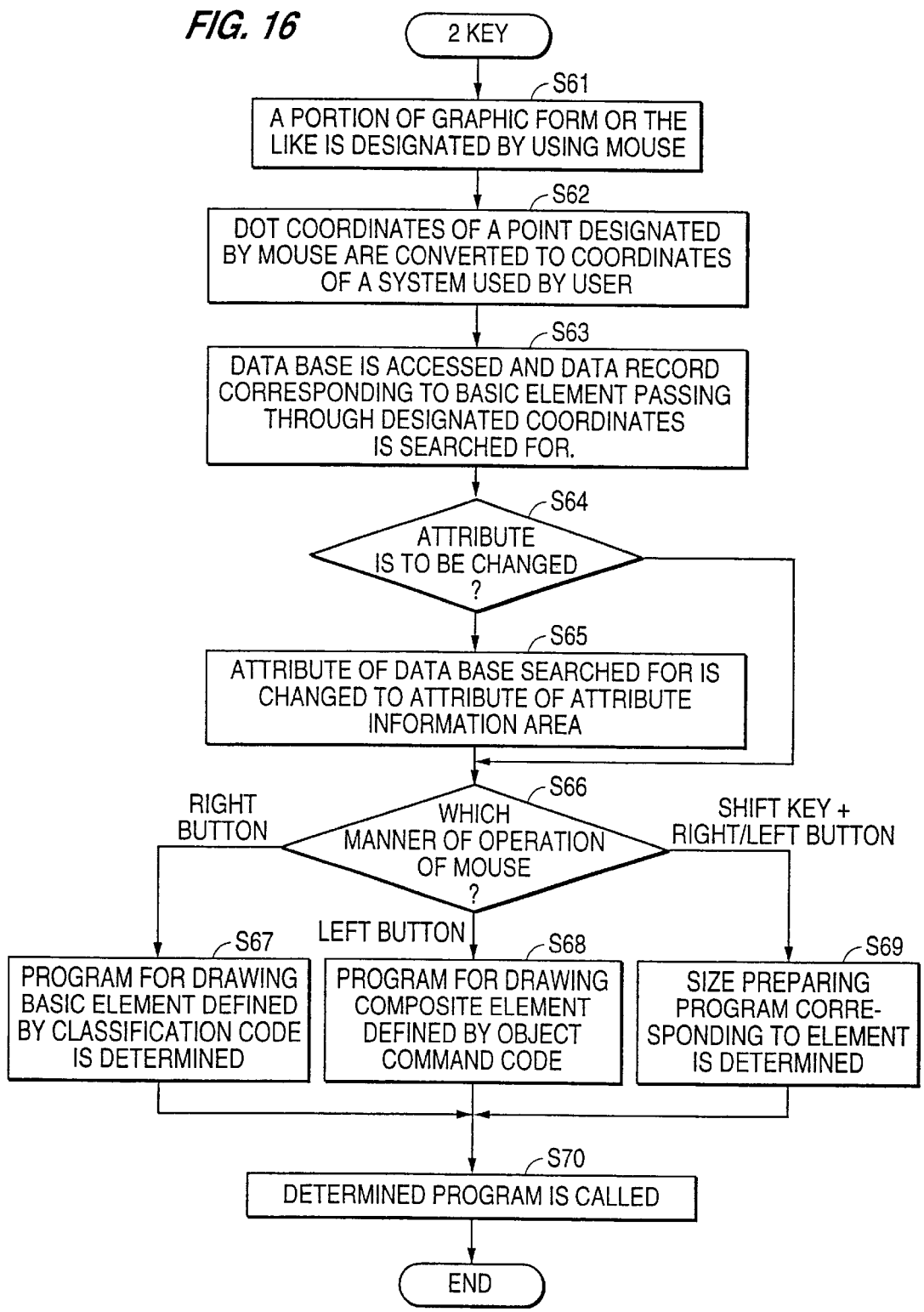
FIG. 16 is a flow chart for explaining graphic command processing according to the second embodiment of the invention.

FIG. 16 is a flow chart for explaining graphic command processing. Referring to FIG. 16, the graphic command processing will be described. The graphic command processing is processing for drawing a desired graphic form or the like by using a basic element or a composite element already drawn on the display 36. A graphic command routine is started by operation of a Q key of the keyboard 19. In step S61, a portion of the graphic form or the like drawn on the display 36 is designated by using the mouse 20. Manners of button operation of the mouse 20 include a manner of operating only a right button of the mouse 20, a manner of operating only a left button of the mouse 20, a manner of operating the right button of the left button of the mouse 20 while depressing a shift key of the keyboard 19. Status information indicating which button operation or key operation is performed is stored in the memory. In step S62, the dot coordinates of the point designated by the mouse 20 are converted to coordinates of a coordinate system used by the user. If the user uses the unit of mm, the coordinates in the dot unit are converted to coordinates in the mm unit. In step S63, the data base is accessed whereby a data record corresponding to the basic element passing through the designated coordinates is searched for. It is to be noted at this time that the search for the data record does not take place on the display of a video RAM or the like but in the data base. Next, in step S64, it is determined whether attributes such as a layer No., a color code, a line type code and a line end code are to be changed or not. When the Q key is operated to start the graphic command routine, an instruction is issued to change the attributes to the attributes in the attribute information area 88 of the display 36 if only the Q key is operated. If both the Q key and the shift key are operated, such instruction is not issued. Accordingly, if only the Q key is operated, the layer No., color code, line type code and line end code of the data record searched for are changed to the attributes in the area 88. Next, in step S66, it is determined which operation manner is selected when the mouse 20 is operated in step S61. If only the right button of the mouse 20 is operated, it is determined that a program for drawing the basic element defined by the classification code included in the data record is called in step S67. In step S70, the determined application program is called. For example, if a portion of the rectangle is designated by operation of the right button of the mouse 20, a program for drawing a straight line is called. If only the left button of the mouse 20 is operated, it is determined in step S68 that a program for drawing the composite element defined by the object command code included in the data record is called. In step S70, the determined application program is called. For example, if a portion of the rectangle is designated by operation of the left button of the mouse 20, a program for drawing the rectangle is called. If the shift key of the keyboard together with the right button or the left button of the mouse 20 is operated, it is determined in step S69 that a size preparing program corresponding to the element is called, and in step S70, the application determined program is called.

Figure 17:
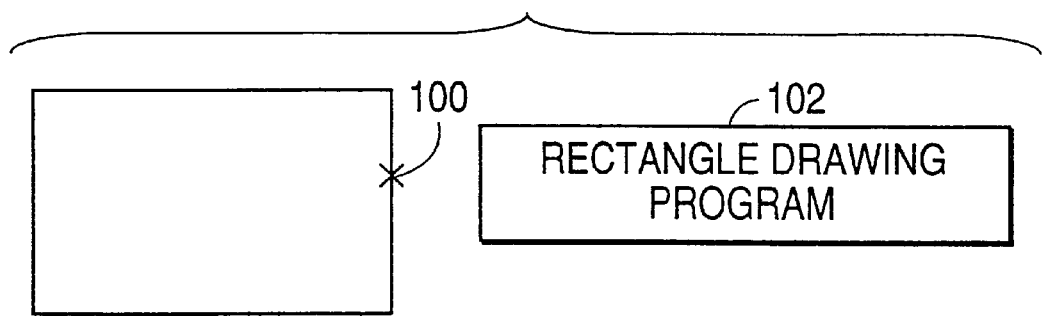
FIG. 17 is a diagram for showing a state where a program called in the graphic command processing shown in FIG. 16 is displayed.
Figure 18:
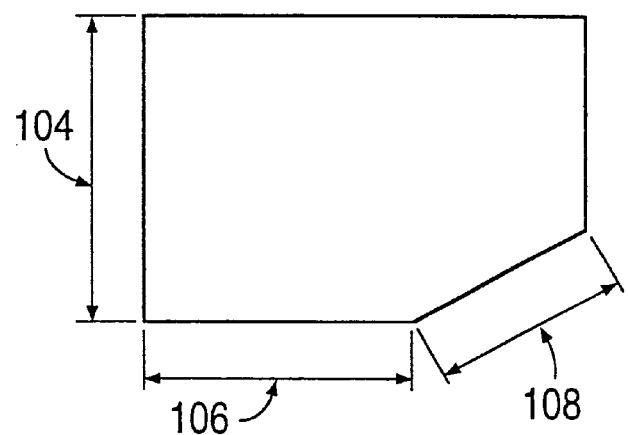
FIG. 18 is a diagram for explaining size defining lines according to the second embodiment of the invention.
Figure 19:
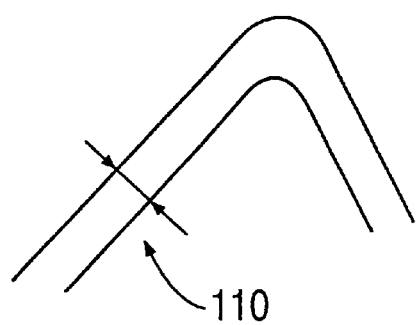
FIG. 19 is a diagram for explaining an offset size according to the second embodiment of the invention.

When the program to be called is determined in steps S67, S68 and S69, the name of the determined program may be shown by blink display 102 near the point 100 designated by the mouse 20 as shown in FIG. 17. Sizes permitted for drawing in this embodiment include a vertical size 104, a horizontal size 106, an oblique size 108 as shown in FIG. 18, and an offset size 110 as shown in FIG. 19, etc.

Figure 20:
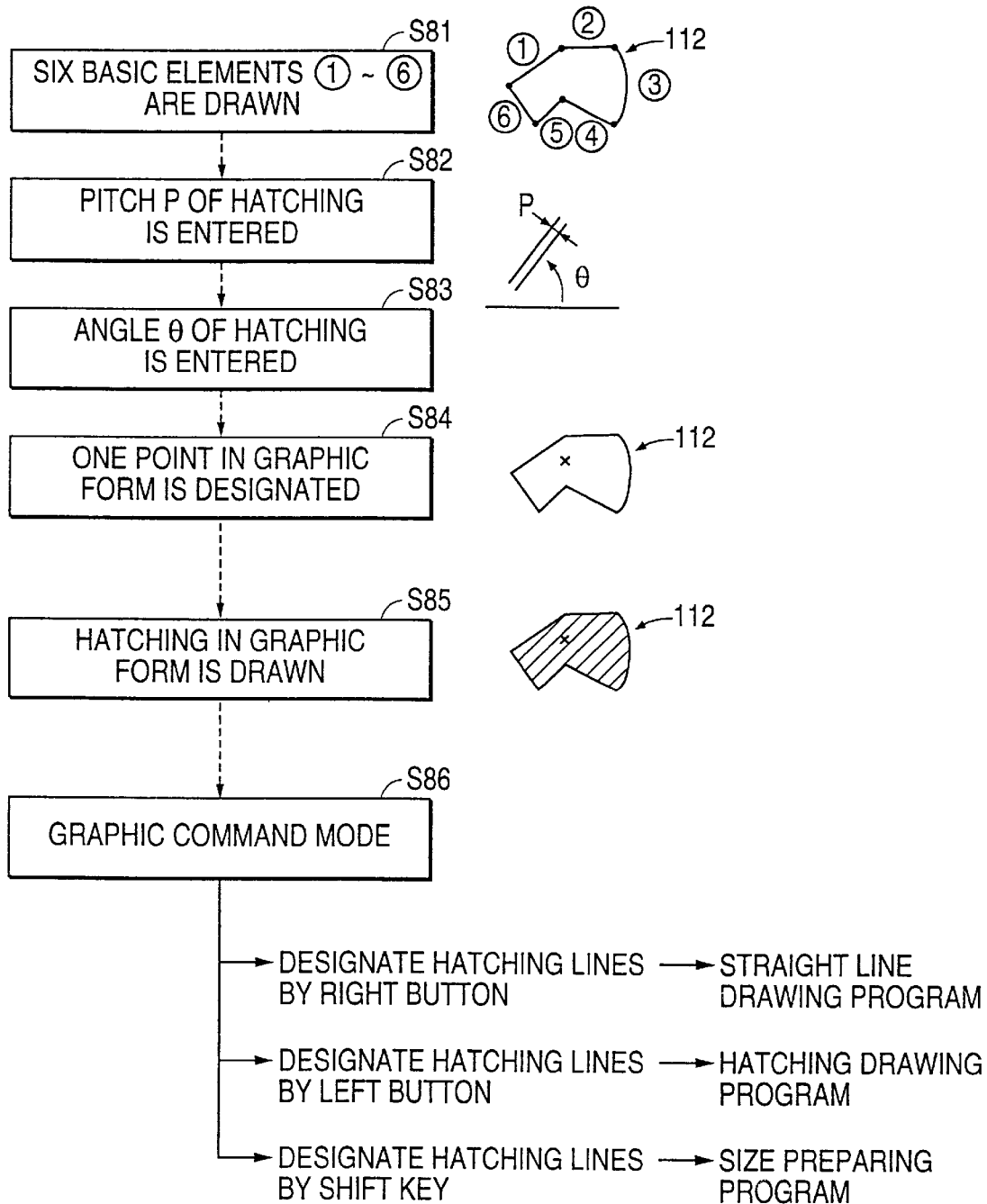
FIG. 20 is a diagram for explaining a specific example of drawing according to the second embodiment of the invention.

FIG. 20 is a diagram showing a specific example of drawing of a graphic form. Referring to FIG. 20, in step S81, six basic elements ① to ⑥ are drawn. The six basic elements may be drawn by using a program for drawing the respective basic elements, selected from the menu shown in the menu area 84 shown in FIG. 12, or if a graphic form 112 formed by the basic elements ① to ⑥ is already registered in the data base, those elements may be drawn by using the registered data of the data base. Next, a program for drawing hatching is selected from the menu displayed in the menu area 84 shown in FIG. 12 for example, so that the program is executed. At first, a message "input pitches of hatching" is displayed in the message area 86 shown in FIG. 12. In step S82, the pitches P of the hatching are input. Next, a message "input the angle of hatching" is displayed in the message area 86. In step S83, the angle θ of the hatching is input. Then, a message "designate a reference point for drawing the hatching" is displayed in the message area 86. In step S84, a point in the graphic form 112 is designated by the mouse for example. As a result, in step S85, the hatching is drawn within the graphic form 112 by using the designated point as a reference. If the Q key of the keyboard 19 is operated in step S86 to start the graphic command routine, the following operation can be carried out by using the mouse 20.

If any one of the hatching lines in the graphic form 112 is designated by operating the right button of the mouse 20, a straight line drawing program starts to be executed. Coordinate data of one point are entered by using the mouse 20 or from the keyboard 19 after the start of the program, whereby the straight line passing through the point can be drawn.

If any one of the hatching lines in the graphic form 112 is designated by operating the left button of the mouse 20, a hatching drawing program is started. After the start of the program, a point in the graphic form drawn previously is designated by using the mouse 20, whereby the hatching can be drawn in the graphic form.

If any one of the hatching lines in the graphic form 112 is designated by operating simultaneously the right or left button of the mouse 20 and the shift key of the keyboard 19, the size preparing program is started. After the start of the program, a portion of the graphic form previously drawn is designated by using the mouse 20, whereby a size defining line can be drawn in the designated portion of the graphic form.

Figure 21:
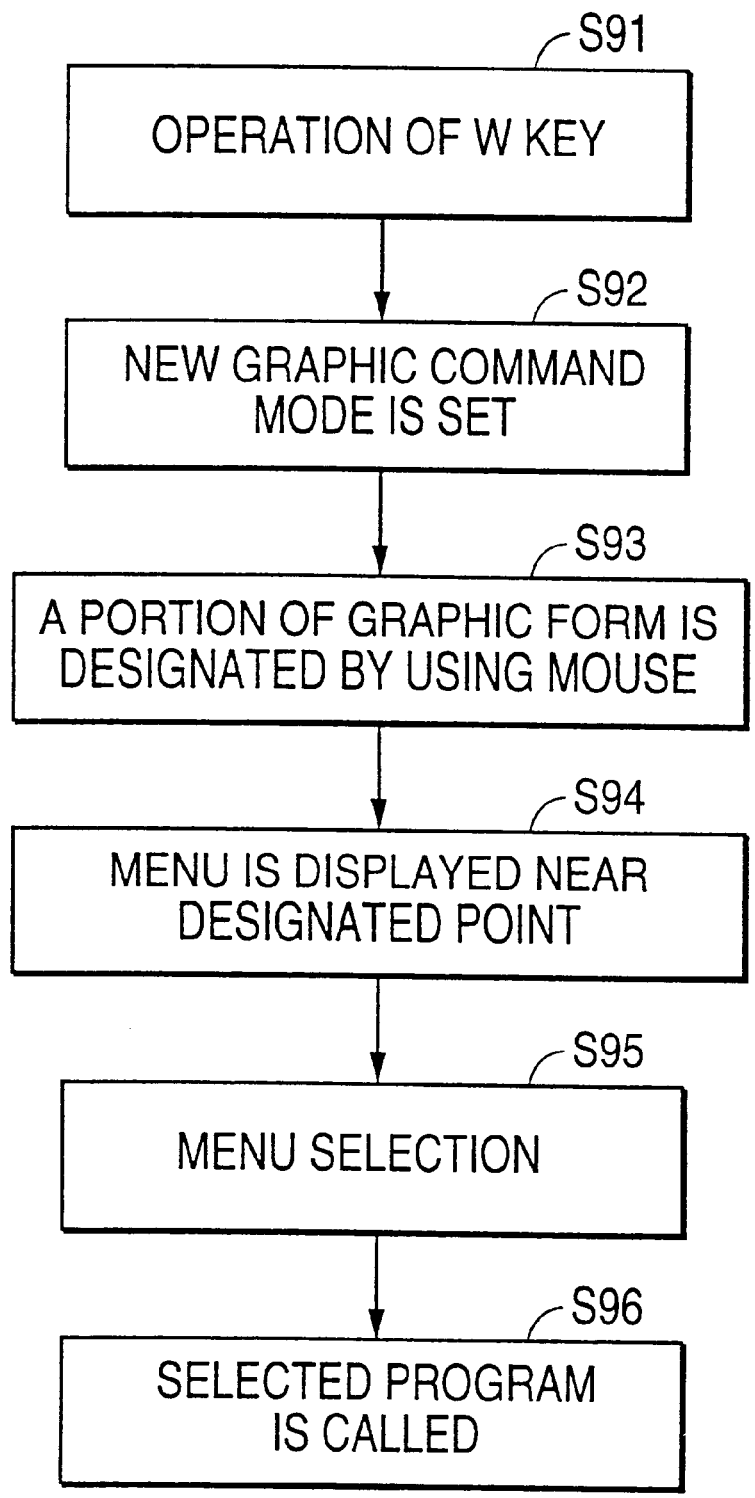
FIG. 21 is a flow chart for explaining a variant of the second embodiment of the invention.
Figure 22A:
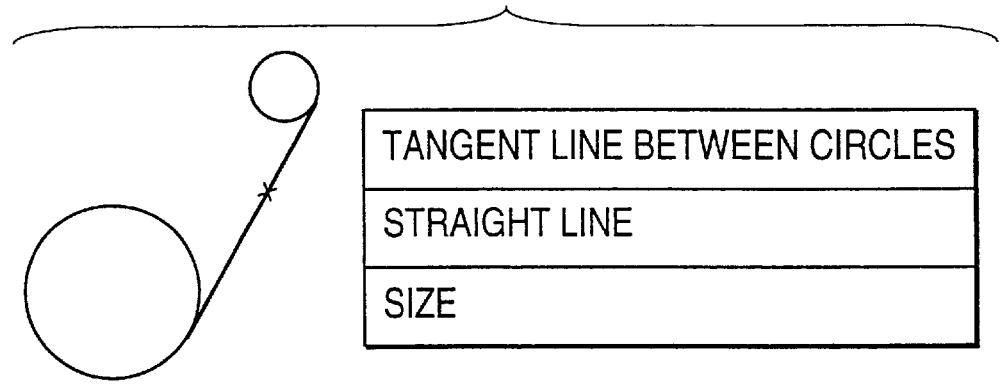
FIGS. 22A and 22B are diagrams showing the menus displayed in the processing shown in FIG. 21.
Figure 22B:
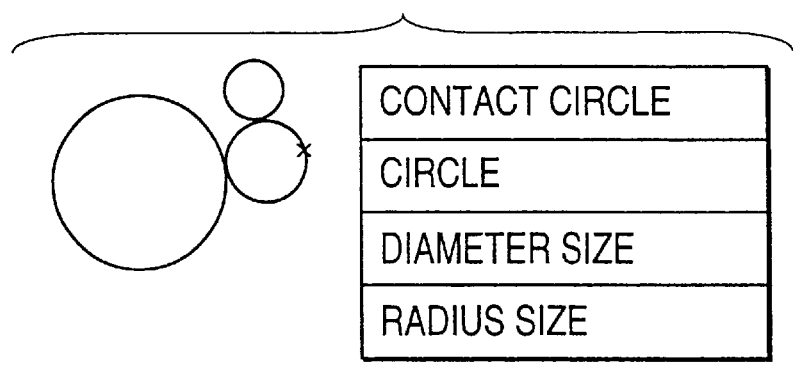
Figure 23:
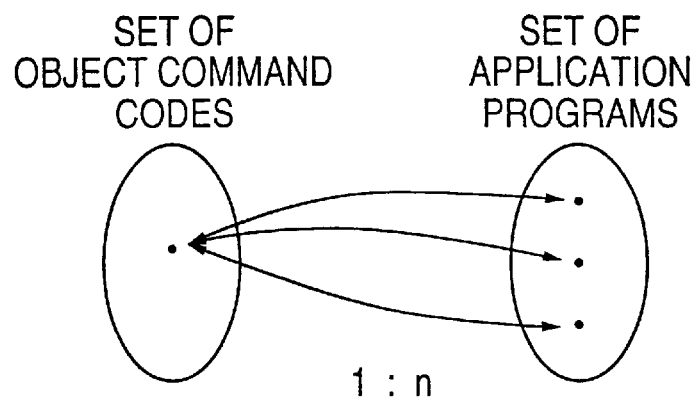
FIG. 23 is an illustration for explaining a relation between the set of object command codes and the set of application programs in the processing shown in FIG. 21.

With reference to the above-described FIGS. 16 to 20, it is stated that different programs can be selected by operation of the mouse even if the same graphic form is designated. Next, description will be made of a new graphic command mode for selecting different programs using menus, not operating the mouse. Referring to FIG. 21, a W key of the keyboard 19 is operated in step S91. When the W key is operated, a new graphic command mode is set in step S92. Next, in step S93, a portion of the graphic form is designated by using the mouse 20. At this time, either of the right and left buttons of the mouse 20 may be used. When a portion of the graphic form is designated, a menu is displayed near the designated point in step S94 as shown in FIG. 22A or 22B. FIG. 22A shows a case where a portion of a tangent line between circles is designated. In this case, the tangent line, a straight line and a size defining line are displayed as the menu. FIG. 22B shows a case where a portion of a contact circle is designated. In this case, the contact circle, a circle, a diameter size defining line and a radius size defining line are displayed as the menu. Those menus are prepared by selecting contents desired by the user for drawing of designated graphic forms. Next, in step S95, the menu is selected by using the mouse 20 and, in step S96, a selected application program for the drawing is called. It is understood that in such a new graphic command mode, a plurality of application programs correspond to one object command code as shown in FIG. 23.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A graphic data processing apparatus comprising:

means for storing containing a plurality of different graphic data programs, each different program for creating graphic data for a different respective data type only, wherein the created graphic data includes a data type and attributes data therefor, with each different graphic data program having an individual set of attribute items therefor;

graphic data storing means for storing graphic data including different data types and attributes data therefor;

means for displaying at least one graphic form based on the graphic data;

means for designating a graphic form displayed on said displaying means;

means for selecting one of the graphic data programs from said graphic data programs storing means in accordance with a data type corresponding to the graphic form designated by the graphic form designating means; and means for configuring said apparatus to activate said graphic data program selected by said selecting means to create graphic data to display the graphic form of a same kind as the graphic form designated by said designating means on said displaying means.

2. A method of processing graphic data on a graphic processing apparatus, comprising the steps of:

storing graphic data including a plurality of different data types and attributes data therefor;

displaying at least one graphic form based on graphic data for one of the different data types;

designating a displayed graphic form;

selecting a graphic data program from a plurality of different accessible graphic data programs, with each different graphic data program for creating graphic data for a different respective data type only, wherein the created graphic data includes a data type and attributes data therefor, with each different graphic data program having an individual set of attribute items therefor, the selection of the graphic data program being in accordance with a data type corresponding to said designated graphic form; and configuring said graphic processing apparatus to activate said graphic data program selected in said selecting step to create graphic data to display the graphic form of a same kind as the graphic form designated in said designating step.

3. A computer-readable medium storing a computer program for causing a computer to behave as a graphic data processing apparatus, said program comprising:

a program portion storing a plurality of different data type and attributes data therefor;

a program portion for storing and accessing a plurality of different graphic data programs in a storage device, each different program of said graphic data programs creating graphic data for a different respective data type only, wherein the created graphic data includes a data type and attributes data therefor, with each different graphic data program having an individual set of attribute items therefor;

a program portion for displaying at least one graphic form based on graphic data;

a program portion for designating a graphic form displayed by said displaying program portion;

a program portion for selecting a graphic data program in accordance with a data type corresponding to the designated graphic form; and a program portion for configuring said computer to activate said graphic program selected in said selecting program portion to create data to display the graphic form of a same kind as the graphic form designated in said designating program portion.

4. A computer-readable medium storing a computer program causing a computer to perform a method of processing graphic data, said method comprising the steps of:

storing a plurality of different data types and attributes data therefor in storage;

displaying at least one graphic form based on graphic data for one of the different data types;

designating a displayed graphic form;

selecting a graphic data program from a plurality of different graphic data programs, with each different graphic data program for creating graphic data for a different respective data type only, wherein the created graphic data includes a data type and attributes data therefor, with each different graphic data program having an individual set of attribute items therefor, the selection of the graphic data program being in accordance with a data type corresponding to said designated graphic form; and configuring said computer to activate said graphic data program selected in said selecting step to create graphic data to display the graphic form of a same kind as the graphic form designated in said designating step.

5. A graphic data processing apparatus comprising:

a first storage device that contains a plurality of different graphic data programs, wherein each different graphic data program creates graphic data for a different respective data type, wherein the created graphic data includes a data type and attributes data therefor, with each different graphic data program having an individual set of attribute items therefor;

a second storage device that stores graphic data including a plurality of the different data types and attributes data therefor;

a display for displaying at least one graphic form based on graphic data;

a mouse that designates a graphic form displayed on said display;

a graphic data program selector that selects one of the graphic data programs from said plurality of different graphic data programs stored in said first storage device in accordance with a data type corresponding to the graphic form designated by the mouse; and a CPU that activates said graphic data program selected by said graphic data program selector to create graphic data to display the graphic form of a same kind as the graphic form designated by said mouse on said display.

6. The graphic data processing apparatus of claim 1, further comprising:

means for changing attribute data corresponding to the graphic form of a same kind as the graphic form designated by the graphic data designating means prior to displaying the graphic form of a same kind as the graphic form designated the graphic data designating means.

7. The graphic data processing apparatus of claim 1, wherein said means for configuring activates said graphic data program selected by said selecting means to display a second graphic form of a same kind as the graphic form designated by said designating means on said displaying means.

8. The graphic data processing apparatus of claim 5, further comprising:

an attribute data changing device that changes attribute data corresponding to the graphic form of a same kind as the graphic form designated by the mouse prior to displaying the graphic form of a same kind as the graphic form designated by the mouse.

9. The graphic data processing apparatus of claim 5, wherein said CPU activates said graphic data program selected by said graphic data program selector to display a second graphic form of a same kind as the graphic form designated by said mouse on said display.

10. The method of processing graphic data of claim 2, further comprising:

changing attribute data corresponding to the graphic form of same kind as the graphic form designated in the graphic data designating step prior to displaying the graphic form of a same kind as the graphic form designated in the graphic data designating step.

11. The method of processing graphic data of claim 2, wherein in said configuring step said graphic data program selected in said selecting step is activated to display a second graphic form of a same kind as the graphic form designated in said designating step.

12. The computer readable medium of claim 3, said program further comprising:

a program portion for changing attribute data corresponding to the graphic form of a same kind as the graphic form designated in the graphic data designating program portion prior to displaying the graphic form of a same kind as the graphic form designated in the graphic data designating program portion.

13. The computer readable medium of claim 3, wherein in said program portion for configuring said computer, said graphic data program selected in said selecting program portion is activated to display a second graphic form of a same kind as the graphic form designated in said designating program portion.

14. The computer readable medium of claim 4, said method further comprising:

changing attribute data corresponding to the graphic form of same kind as the graphic form designated in the graphic data designating step prior to displaying the graphic form of a same kind as the graphic form designated in the graphic data designating step.

15. The computer readable medium of claim 4, wherein in said configuring step said graphic data program selected in said selecting step is activated to display a second graphic form of a same kind as the graphic form designated in said designating step.

* * * * *